US011322825B2

(12) United States Patent
Oh et al.

(10) Patent No.: US 11,322,825 B2
(45) Date of Patent: May 3, 2022

(54) ANTENNA-DECO FILM STACK STRUCTURE AND DISPLAY DEVICE INCLUDING THE SAME

(71) Applicant: DONGWOO FINE-CHEM CO., LTD., Jeollabuk-do (KR)

(72) Inventors: Yun Seok Oh, Gyeonggi-do (KR); Han Sub Ryu, Gyeongsangbuk-do (KR); Yoon Ho Huh, Incheon (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 45 days.

(21) Appl. No.: 16/854,464

(22) Filed: Apr. 21, 2020

(65) Prior Publication Data
US 2020/0251807 A1    Aug. 6, 2020

Related U.S. Application Data

(63) Continuation of application No. PCT/KR2019/012802, filed on Oct. 1, 2019.

(30) Foreign Application Priority Data

Oct. 17, 2018 (KR) .................. 10-2018-0123823

(51) Int. Cl.
*H01Q 1/38* (2006.01)
*H01Q 1/24* (2006.01)
*H01Q 1/52* (2006.01)

(52) U.S. Cl.
CPC ............. *H01Q 1/243* (2013.01); *H01Q 1/38* (2013.01); *H01Q 1/526* (2013.01)

(58) Field of Classification Search
CPC .......... H01Q 1/243; H01Q 1/38; H01Q 1/526; H01Q 9/0407; H01Q 21/065; H01Q 1/48; H01Q 1/50; H01Q 1/22; H01Q 1/422; G09F 9/30; G02B 5/20
See application file for complete search history.

(56) References Cited

U.S. PATENT DOCUMENTS

2007/0023888 A1* 2/2007 Fujii ................... H01L 23/3114
257/698
2012/0223865 A1* 9/2012 Li ........................... H01Q 9/42
343/702

(Continued)

FOREIGN PATENT DOCUMENTS

| KR | 10-2003-0095557 A | 12/2003 |
| KR | 10-2015-0104509 A | 9/2015 |

(Continued)

*Primary Examiner* — David E Lotter
(74) *Attorney, Agent, or Firm* — The PL Law Group, PLLC

(57) ABSTRACT

An antenna-deco film stack structure includes a deco film including a light-shielding portion and a transmissive portion, a dielectric layer facing the deco film, an antenna pattern disposed on an upper surface of the dielectric layer and disposed under the deco film, the antenna pattern being at least partially covered by the light-shielding portion, and a ground pattern on a lower surface of the dielectric layer to at least partially cover the antenna pattern. The deco film and the antenna pattern are combined to improve radiation reliability and optical property of the antenna pattern. A display device including the antenna-deco film stack structure is also provided.

16 Claims, 5 Drawing Sheets

(56) References Cited

U.S. PATENT DOCUMENTS

| | | | | |
|---|---|---|---|---|
| 2013/0278480 A1* | 10/2013 | McMilin | ............... | H01Q 9/0457 |
| | | | | 343/904 |
| 2014/0253392 A1* | 9/2014 | Yarga | .................... | H01Q 5/328 |
| | | | | 343/702 |
| 2015/0255856 A1* | 9/2015 | Hong | ................... | H01Q 9/0407 |
| | | | | 343/702 |
| 2016/0093939 A1* | 3/2016 | Kim | ...................... | H01Q 1/243 |
| | | | | 343/720 |
| 2017/0102804 A1* | 4/2017 | Kikukawa | ................ | G06F 3/047 |
| 2019/0220123 A1* | 7/2019 | Kanaya | ................. | G06F 3/0443 |

FOREIGN PATENT DOCUMENTS

| KR | 10-2016-0027446 A | 3/2016 |
|---|---|---|
| KR | 10-2016-0097461 A | 8/2016 |
| KR | 10-1744886 B1 | 6/2017 |
| KR | 10-2018-0023095 A | 3/2018 |
| KR | 10-2018-0099234 A | 9/2018 |

\* cited by examiner

ANTENNA-DECO FILM STACK STRUCTURE AND DISPLAY DEVICE INCLUDING THE SAME

CROSS-REFERENCE TO RELATED APPLICATION AND CLAIM OF PRIORITY

The present application is a continuation application to International Application No. PCT/KR2019/012802 with an International Filing Date of Oct. 1, 2019, which claims the benefit of Korean Patent Application No. 10-2018-0123823 filed on Oct. 17, 2018 at the Korean Intellectual Property Office, the disclosures of which are incorporated by reference herein in their entirety.

BACKGROUND

1. Field

The present invention relates to an antenna-deco film stack structure and a display device including the same. More particularly, the present invention related to an antenna-deco film stack structure including a plurality of antenna patterns and a display device including the same.

2. Description of the Related Art

As information technologies have been developed, a wireless communication technology such as Wi-Fi, Bluetooth, etc., is combined with a display device in, e.g., a smartphone. In this case, an antenna may be combined with the display device to provide a communication function.

Mobile communication technologies have been rapidly developed, an antenna capable of operating high or ultra-high frequency, e.g., 3G to 5G communications is needed in the display device.

The display device may include various conductive patterns such as electrodes included in a thin film transistor (TFT), a scan line, a data line, a power line, etc. Radiation interruption with respect to the antenna may be caused by the conductive patterns, and thus desired high frequency and high gain properties may not be easily obtained.

Further, when the display device includes a sensor member such as a touch sensor, signal interruption or impedance mismatching may be also caused by the sensor member.

If the antenna is viewed by a user, desired image of the display device may be hindered by the display device.

SUMMARY

According to an aspect of the present invention, there is provided an antenna-deco film stack structure having improved signaling efficiency and reliability.

According to an aspect of the present invention, there is provided a display device including the antenna-deco film stack structure and having improved image quality.

The above aspects of the present invention will be achieved by the following features or constructions:

(1) An antenna-deco film stack structure, including: a deco film including a light-shielding portion and a transmissive portion; a dielectric layer facing the deco film; an antenna pattern disposed on an upper surface of the dielectric layer and disposed under the deco film, the antenna pattern being at least partially covered by the light-shielding portion; and a ground pattern on a lower surface of the dielectric layer to at least partially cover the antenna pattern.

(2) The antenna-deco film stack structure according to the above (1), wherein the antenna pattern includes a plurality of antenna patterns which are disposed under the light-shielding portion.

(3) The antenna-deco film stack structure according to the above (2), wherein the ground pattern overlaps the plurality of antenna patterns in a planar view.

(4) The antenna-deco film stack structure according to the above (1), wherein the antenna pattern includes a radiation electrode, a pad and a transmission line electrically connecting the radiation electrode and the pad.

(5) The antenna-deco film stack structure according to the above (4), wherein the pad is disposed under the light-shielding portion of the deco film, and the radiation electrode is disposed under the transmissive portion of the deco film.

(6) The antenna-deco film stack structure according to the above (5), wherein the radiation electrode includes a mesh structure.

(7) The antenna-deco film stack structure according to the above (6), wherein the pad has a solid pattern structure.

(8) The antenna-deco film stack structure according to the above (6), further including a dummy mesh electrode on the upper surface of the dielectric layer to be separated from the radiation electrode, the dummy mesh electrode being disposed under the transmissive portion.

(9) The antenna-deco film stack structure according to the above (8), wherein the radiation electrode or the dummy mesh electrode is blackening-treated.

(10) The antenna-deco film stack structure according to the above (8), further including a mesh ground pattern on the lower surface of the dielectric layer, wherein the mesh ground pattern overlaps the dummy mesh electrode in a planar view.

(11) The antenna-deco film stack structure according to the above (4), wherein the ground pattern overlaps the radiation electrode of the antenna pattern, and does not overlap the pad.

(12) The antenna-deco film stack structure according to the above (4), wherein the pad includes a signal pad connected to the transmission line, and a ground pad spaced apart from the signal pad and electrically separated from the transmission line.

(13) The antenna-deco film stack structure according to the above (4), wherein the ground pad includes a pair of ground pads facing each other with respect to the signal pad.

(14) A display device, including: a display panel; and the antenna-deco film stack structure according to exemplary embodiments as described above on the display panel.

(15) The display device according to the above (14), further including a touch sensor between the display panel and the antenna-deco film stack structure.

(16) The display device according to the above (14), wherein the dielectric layer of the antenna-deco film stack structure includes a polarizing layer.

(17) The display device according to the above (14), further including a polarizing layer between the display panel and the antenna-deco film stack structure.

(18) The display device according to the above (14), further including a touch sensor between the display panel and the antenna-deco film stack structure and a polarizing layer between the touch sensor and the antenna-deco film stack structure.

In an antenna-deco film stack structure according to exemplary embodiments as described above, an antenna pattern may be disposed under a light-shielding portion of a deco film. Thus, the antenna pattern may be prevented from being viewed, and interference from a conductive pattern of a display device or a touch sensor may be reduced.

The stack structure may include a ground pattern formed under a dielectric layer on which the antenna pattern is formed. Thus, a radiation property of the antenna pattern may be independently controlled from other conductive members.

DETAILED DESCRIPTION OF THE EMBODIMENTS

According to exemplary embodiments of the present invention, an antenna-deco film stack structure is provided. The antenna-deco film stack structure may include a deco-film and an antenna pattern disposed under the deco film, and may have improved radiation and optical properties. A display device including the antenna-deco film stack structure is also provided.

The term "stack structure" used herein includes an independent and integral single structure or a combined structure, and may also include an assembly of elements in a display device.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

Figure 1:
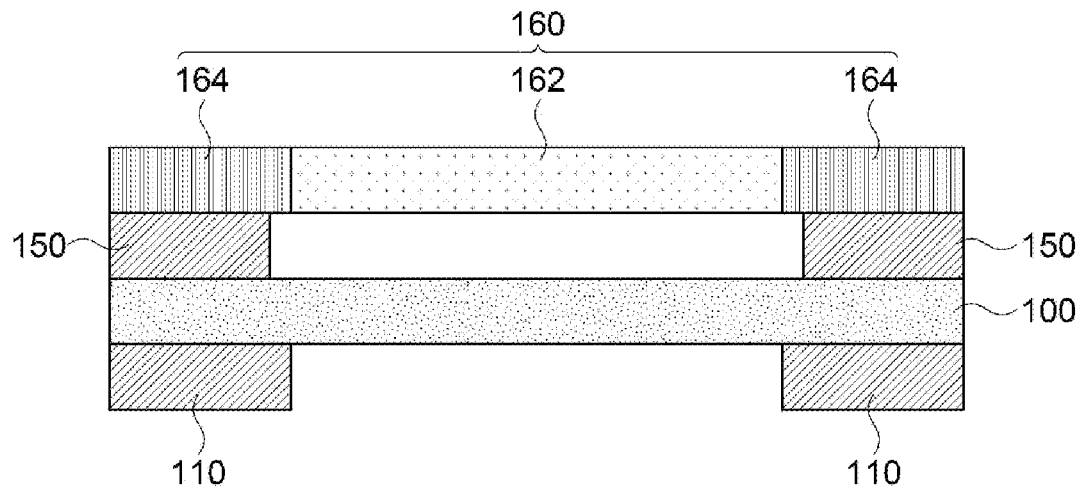
FIG. 1 is a schematic cross-sectional view illustrating an antenna-deco film stack structure in accordance with exemplary embodiments.

FIG. 1 is a schematic cross-sectional view illustrating an antenna-deco film stack structure in accordance with exemplary embodiments.

Referring to FIG. 1, the antenna-deco film stack structure (hereinafter, also abbreviated as a stack structure) may include a deco film 160, an antenna pattern 150, a dielectric layer 100 and a ground pattern 110.

The deco film 160 may be disposed toward, e.g., a viewer's side of a display device to prevent a wiring, an electrode, etc., from being seen by the viewer. The deco film 160 may include a transmissive portion 162 and a light-shielding portion 164. The light-shielding portion 164 may be disposed around a periphery or a boundary of the transmissive portion 162. For example, the light-shielding portion 164 may be disposed at both end portions of the transmissive portion 162.

For example, the light-shielding portion 164 may correspond to a bezel portion of a display device. For example, a peripheral portion of a film including a transparent resin such as polyethylene, polycarbonate, polymethylmethacrylate, polyester, etc., may be color-treated (e.g., black-treated) to form the light-shielding portion 164.

FIG. 1 illustrates the light-shielding portion 164 and the transmissive portion 162 as one planar film shape. However, the light-shielding portion 164 may be defined by forming a color pattern at a peripheral region of the deco film 160.

The antenna pattern 150 may be formed on an upper surface of the dielectric layer 100, and may be disposed under the deco film 160. In exemplary embodiments, the antenna pattern 150 may be disposed under the light-shielding portion 164. Accordingly, the antenna pattern 150 may be interposed between the dielectric layer 100 and the deco film 160. Elements and structures of the antenna pattern 150 will be described in more detail with reference to FIG. 2.

The dielectric layer 100 may include, e.g., a transparent resin material. For example, the dielectric layer 100 may include, e.g., a polyester-based resin such as polyethylene terephthalate, polyethylene isophthalate, polyethylene naphthalate, polybutylene terephthalate, etc.; a cellulose-based resin such as diacetyl cellulose, triacetyl cellulose, etc.; a polycarbonate-based resin; an acryl-based resin such as polymethyl (meth)acrylate, polyethyl (meth)acrylate, etc.; a styrene-based resin such as polystyrene, an acrylonitrile-styrene copolymer; a polyolefin-based resin such as polyethylene, polypropylene, a polyolefin having a cyclo or norbornene structure, an ethylene-propylene copolymer, etc.; a vinyl chloride-based resin; an amide-based resin such as nylon, an aromatic polyamide, etc.; an imide-based resin; a polyether sulfone-based resin; a sulfone-based resin; a polyether ketone-based resin; a polyphenylene sulfide-based resin; a vinyl alcohol-based resin; a vinylidene chloride-based resin; a vinyl butyral-based resin; an allylate-based resin; a polyoxymethylene-based resin; an epoxy-based resin; a urethane or acryl urethane-based resin; a silicone-based resin, etc. These may be used alone or in a combination thereof.

In some embodiments, the dielectric layer 100 may include an inorganic insulation material such as silicon oxide, silicon nitride, silicon oxynitride, glass, or the like.

In some embodiments, an adhesive film including, e.g., a pressure sensitive adhesive (PSA), an optically clear adhesive (OCA), or the like may be included in the dielectric layer 100.

The dielectric layer 100 may have a substantially single layered structure, or may have a multi-layered structure including at least two layers.

A capacitance or an inductance may be created in the dielectric layer 100 so that a frequency range in which the antenna pattern 150 may be operated may be controlled. In some embodiments, a dielectric constant of the dielectric layer 100 may be in a range from about 1.5 to about 12. If the dielectric constant exceeds about 12, a driving frequency may be excessively decreased and a desired high-frequency radiation may not be implemented. Preferably, the dielectric constant of the dielectric layer 100 may be in a range from about 2 to about 12.

The ground pattern 110 may be disposed on a lower surface of the dielectric layer 100, and may at least partially overlap the antenna pattern 150 with respect to the dielectric layer 100.

In some embodiments, the ground pattern 110 may entirely overlap the antenna pattern 150. For example, a top surface of the ground pattern 110 may substantially entirely cover a bottom surface of the antenna pattern 150 in a planar view.

The ground pattern 110 may include (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), tin (Sn), zinc (Zn), molybdenum (Mo), calcium (Ca) or an alloy thereof. These may be used alone or in a combination thereof.

In some embodiments, the ground pattern 110 may include a transparent metal oxide such as indium tin oxide (ITO), indium zinc oxide (IZO), indium zinc tin oxide (IZTO), zinc oxide ($ZnO_x$), etc.

Figure 2:
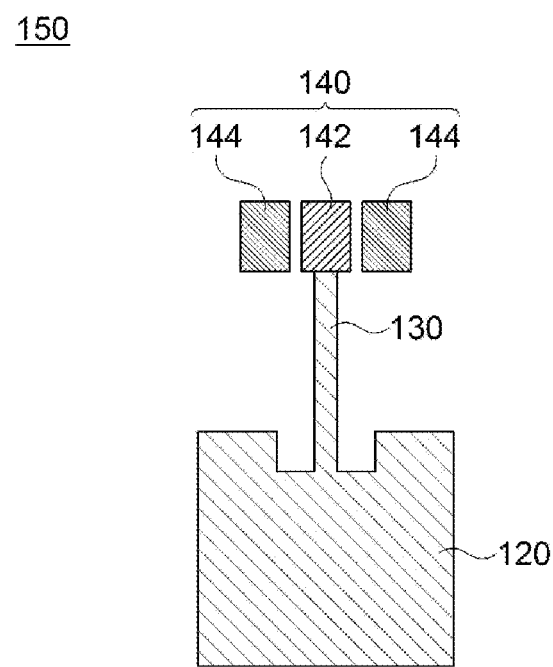
FIG. 2 is a schematic top planar view illustrating a construction of an antenna pattern in accordance with exemplary embodiments.

FIG. 2 is a schematic top planar view illustrating a construction of an antenna pattern in accordance with exemplary embodiments.

Referring to FIG. 2, the antenna pattern 150 may include a radiation electrode 120, a transmission line 130 and a pad 140. The pad 140 may include a signal pad 142 and a ground pad 144.

The radiation electrode 120 may have, e.g., a polygonal plate shape, and the transmission line 130 may extend from a central portion of the radiation electrode 120 to be electrically connected to the signal pad 142. The transmission line 130 may be formed as a substantially unitary member with the radiation electrode 120.

In some embodiments, a pair of the ground pads 144 may be disposed to face each other with respect to the signal pad 142. The ground pads 144 may be electrically separated from the signal pad 142 and the transmission line 130.

The radiation electrode 120, the transmission line 130 and/or the pad 140 may include (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), tin (Sn), zinc (Zn), molybdenum (Mo), calcium (Ca) or an alloy thereof. These may be used alone or in a combination thereof.

For example, the radiation electrode 120 may include silver or a silver alloy for achieving a low resistance. For example, the radiation electrode 120 may include silver-palladium-copper (APC) alloy.

In an embodiment, the radiation electrode 120 may include copper (Cu) or a copper alloy in consideration of low resistance and pattern formation with a fine line width. For example, the radiation electrode 120 may include a copper-calcium (Cu—Ca) alloy.

In an embodiment, the radiation electrode 120, the transmission line 130 and/or the pad 140 may have a solid pattern structure for improving radiation/gain properties and signal transfer speed.

In some embodiments, the radiation electrode 120 may include a transparent metal oxide such as indium tin oxide (ITO), indium zinc oxide (IZO), indium zinc tin oxide (IZTO), zinc oxide (ZnOx), etc.

For example, the radiation electrode 120 may have a multi-layered structure including a metal layer or alloy layer and a transparent metal oxide layer.

Figure 3:
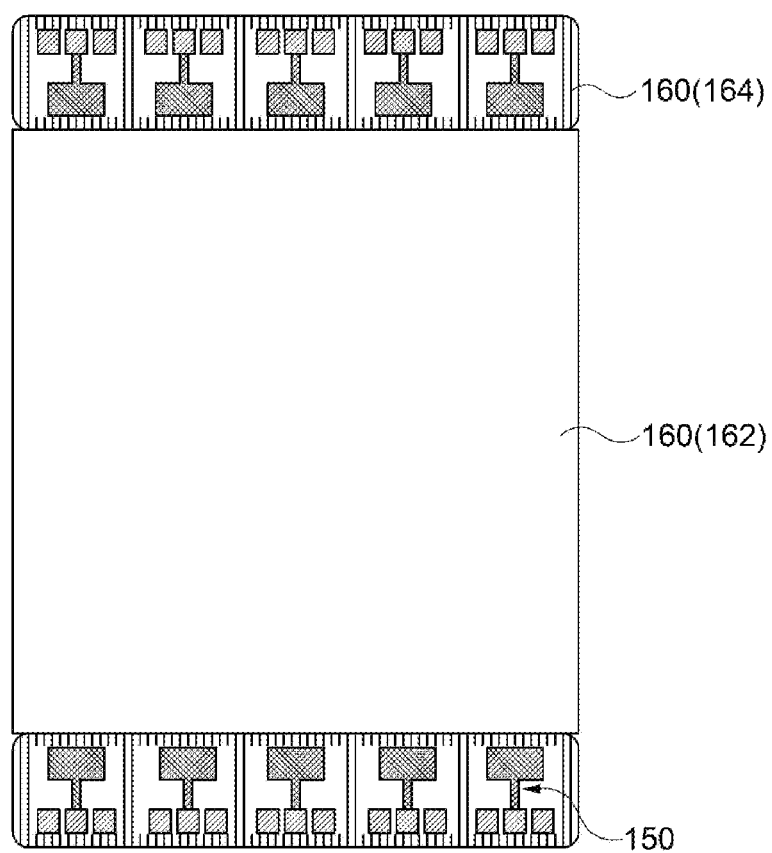
FIG. 3 is a schematic top planar view illustrating an antenna-deco film stack structure in accordance with exemplary embodiments.

FIG. 3 is a schematic top planar view illustrating an antenna-deco film stack structure in accordance with exemplary embodiments.

Referring to FIG. 3, as illustrated in FIG. 1, the antenna pattern 150 may be disposed under the light-shielding portion 164 of the deco film 160. As illustrated in FIG. 3, a plurality of the antenna patterns 150 may be formed as an array shape to be covered by the light-shielding portion 164 of the deco film 160.

In some embodiments, the light-shielding portions 164 may be adjacent to both end portions (e.g., an upper portion and a lower portion in FIG. 3) of the transmissive portion 162. For example, an antenna pattern row including a plurality of the antenna patterns 150 may be disposed under each light-shielding portion 164.

As illustrated in FIG. 3, the antenna pattern array or the antenna pattern row may be entirely shielded or covered by the light-shielding portion 164 in a planar view. Thus, the antenna patterns 150 may be prevented from being seen by a user of a display device including the stack structure.

As described with reference to FIGS. 1 to 3, the antenna pattern 150 may be combined with the deco film 160. Accordingly, signal and radiation interruption from a sensor member or conductive patterns included in the display device may be avoided, and operational independency or free radiation of the antenna pattern 150 may be enhanced.

Further, a plurality of the antenna patterns 150 may be disposed as an array shape to be adjacent to the deco film 160 that may be exposed to the user so that gain amount of the antenna pattern 150 may be remarkably increased. The ground pattern 110 may be matched with the antenna pattern 150 using the dielectric layer 100 so that impedance matching and signal directivity may be also improved.

Figure 4:
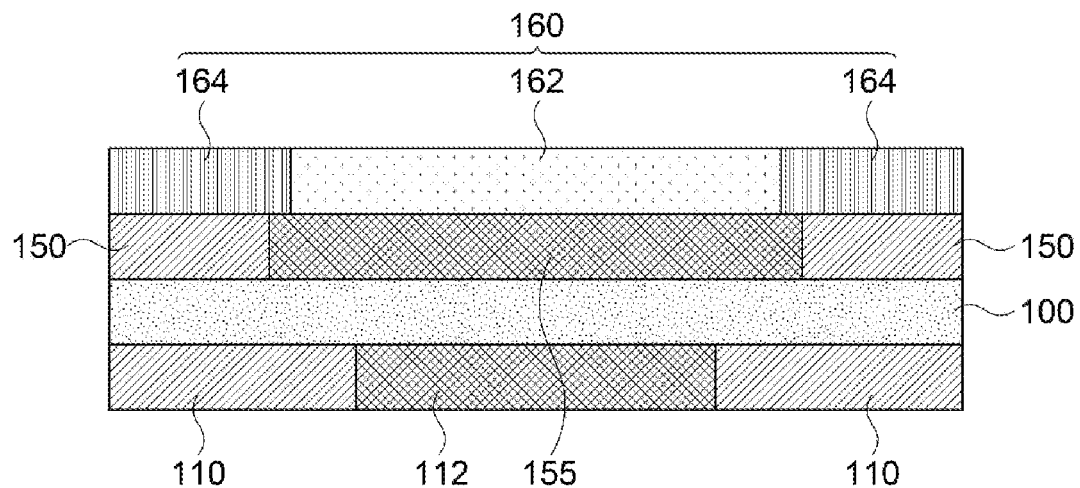
FIGS. 4 and 5 are a cross-sectional view and a top planar view, respectively, illustrating an antenna-deco film stack structure in accordance with some exemplary embodiments.
Figure 5:
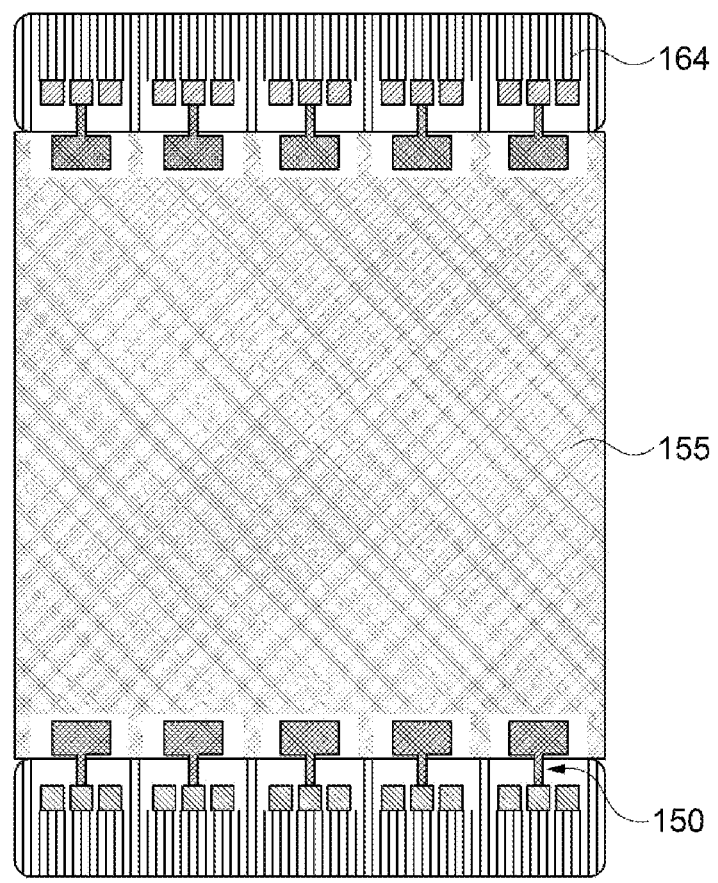

FIGS. 4 and 5 are a cross-sectional view and a top planar view, respectively, illustrating an antenna-deco film stack structure in accordance with some exemplary embodiments. Detailed descriptions on elements and/or structure substantially the same as or similar to those described with reference to FIGS. 1 to 3 are omitted herein.

Referring to FIGS. 4 and 5, the antenna pattern 150 may partially overlap the light-shielding portion 164 of the deco film 160. In some embodiments, the radiation electrode 120 (see FIG. 2) included in the antenna pattern 150 may be exposed to an outside of the light-shielding portion 164 to overlap the transmissive portion 162. The transmission line 130 may also partially overlap the transmissive portion 162.

When the radiation electrode 120 may extend in a region at which the transmissive portion 162 is located, the radiation electrode 120 may be formed as a mesh structure including the metal as mentioned above to reduce visibility. In an embodiment, the pad 140 overlapping the light-shielding portion 164 may have the solid pattern structure as described above.

In this case, the radiation electrode 120 may be formed of the mesh structure so that transmittance at the transmissive portion 162 may be enhanced, and the pad 140 shielded by the light-shielding portion 164 may be formed of the solid pattern structure so that radiation loss may be prevented, and signal transfer speed and gain property may be improved. Further, an adhesion between the pad 140 and a flexible circuit board when performing a bonding process may be improved.

In exemplary embodiments, a dummy mesh electrode 155 may be formed around the radiation electrode 120 so that a pattern structure around the radiation electrode 120 may be averaged to prevent a pattern visibility. In some embodiments, the dummy mesh electrode 155 may be physically and electrically separated from the radiation electrode 120, and may be formed under a substantially entire region of the transmissive portion 162.

In some embodiments, the radiation electrode 120 or the dummy mesh electrode 155 may be blackening-treated.

For example, a surface of the radiation electrode 120 or the dummy mesh electrode 155 may be thermally oxidized to reduce a reflectance. Thus, an electrode visibility caused by a light reflectance from the surface of the radiation electrode 120 or the dummy mesh electrode 155 may be reduced.

In an embodiment, an oxide layer may be formed on the surface of the radiation electrode 120 or the dummy mesh electrode 155 to reduce the reflectance and improve the transmittance so that the electrode visibility may be reduced.

In some embodiments, a mesh ground pattern 112 may be formed under the dielectric layer 100. The mesh ground pattern 112 may be interposed between the ground patterns 110, and may substantially entirely overlap the transmissive portion 162 or the dummy mesh electrode 155. The mesh ground pattern 112 may include a mesh structure substantially the same as or similar to that of the dummy mesh electrode 155.

The mesh ground pattern 112 may be included so that a grounding efficiency with respect to the antenna pattern 150 may be further improved without degrading an image display in the transmissive portion 162.

Figure 6:
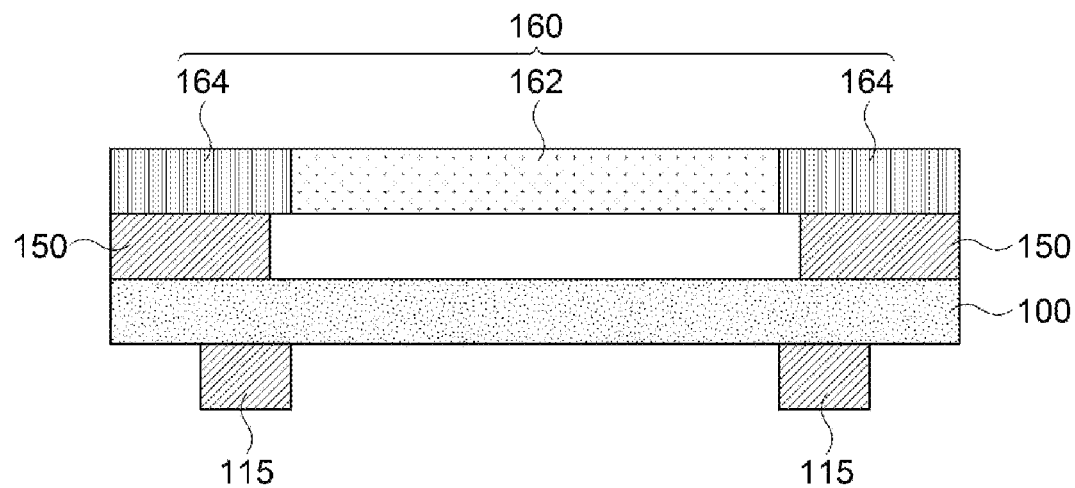
FIGS. 6 and 7 are a cross-sectional view and a top planar view, respectively, illustrating an antenna-deco film stack structure in accordance with some exemplary embodiments.
Figure 7:
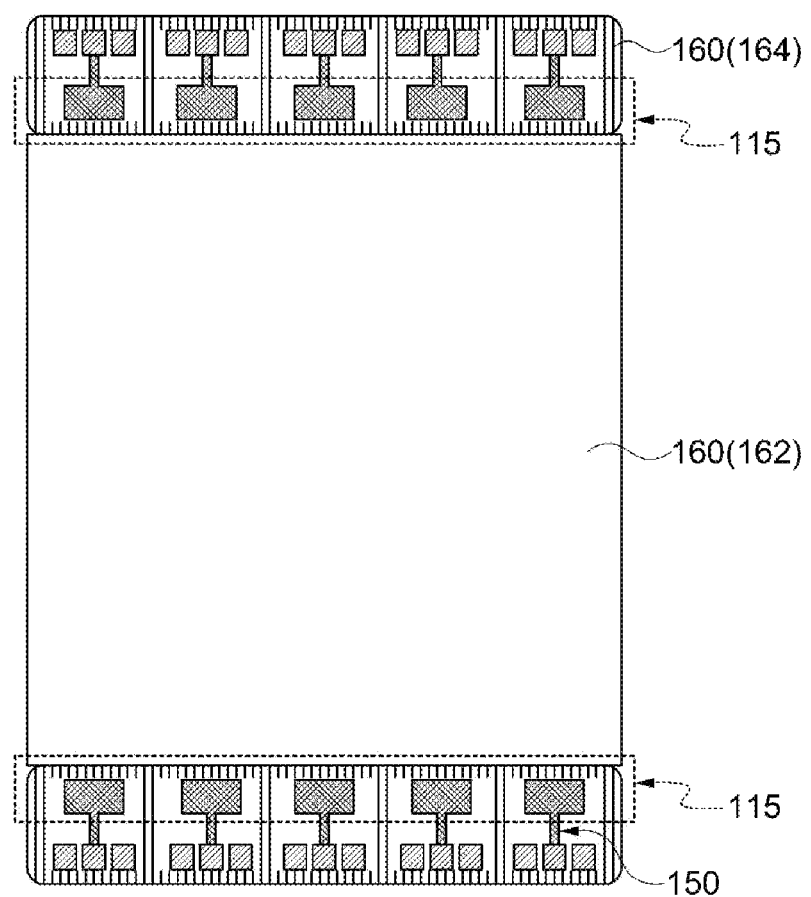

FIGS. 6 and 7 are a cross-sectional view and a top planar view, respectively, illustrating an antenna-deco film stack structure in accordance with some exemplary embodiments.

Referring to FIGS. 6 and 7, a ground pattern 115 may partially overlap the antenna pattern 150 in a planar view. As indicated by a dotted line, the ground pattern 115 may selectively overlap the radiation electrode 120 of the antenna pattern 150. For example, the ground pattern 115 may extend to commonly overlap the radiation electrodes 120 included in a plurality of the antenna patterns 150 in the antenna pattern row, and may not overlap the pads 140 (see FIG. 2) of the antenna patterns.

In exemplary embodiments, the ground pattern 115 may selectively overlap the radiation electrode 120 so that a vertical radiation property of the radiation electrode 120 may be improved, and a signal directivity may be also increased. As illustrated in FIG. 2, in the antenna pattern 150 including the ground patterns 144 and the radiation electrode 120 at the same plane and also having a horizontal radiation property, the pads 140 and the ground patterns 115 may not overlap each other so that an impedance mismatching or a frequency shift due to an interaction with the ground pad 144 may be prevented and a signal transfer efficiency may be enhanced.

Figure 8:
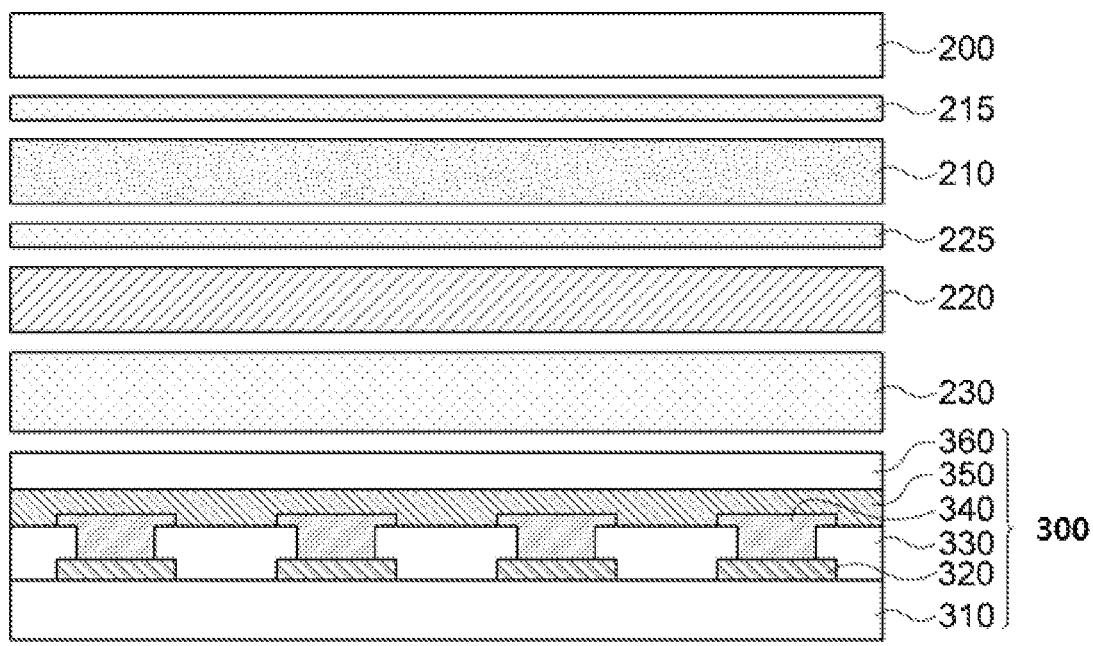
FIG. 8 is a schematic cross-sectional view illustrating a display device in accordance with exemplary embodiments.

FIG. 8 is a schematic cross-sectional view illustrating a display device in accordance with exemplary embodiments.

Referring to FIG. 8, the display device may include the antenna-deco film stack structure 200 according to exemplary embodiments as described above, a polarizing layer 210 and a touch sensor 220.

The antenna-deco film stack structure 200 may be disposed toward a front face or a viewer side of the display device. In some embodiments, a window substrate may be further stacked on the antenna-deco film stack structure 200.

The polarizing layer 210 may include a coating-type polarizer or a polarizing plate. The coating-type polarizer may include a liquid crystal coating layer that may include a cross-linkable liquid crystal compound and a dichroic dye. In this case, the polarizing layer 210 may include an alignment layer for providing an orientation of the liquid crystal coating layer.

For example, the polarizing plate may include a polyvinyl alcohol-based polarizer and a protective film attached to at least one surface of the polyvinyl alcohol-based polarizer.

In some embodiments, the polarizing layer 210 may be attached to the antenna-deco film stack structure via a first adhesive layer 215. In some embodiments, the polarizing layer 210 may be included in the antenna-deco film stack structure 200 to serve as the dielectric layer 100.

The touch sensor 220 may include sensing electrodes and traces, and may be disposed under the antenna-deco film stack structure 200 as a film or a panel. In an embodiment, the touch sensor 220 may be combined with the polarizing layer 210 via a second adhesive layer 225.

If the touch sensor 220 includes a substrate, the substrate may include, e.g., triacetyl cellulose, cycloolefin, cycloolefin copolymer, polynorbornene copolymer, etc., and may have an in-plane retardation of ±2.5 nm or less.

As illustrated in FIG. 8, the antenna-deco film stack structure 200, the polarizing layer 210 and the touch sensor 200 may be sequentially positioned from the viewer side.

In an embodiment, the antenna-deco film stack structure 200, the touch sensor 220 and the polarizing layer 210 may be sequentially positioned from the viewer side.

In an embodiment, as described above, the polarizing layer 210 may be included in the antenna-deco film stack structure 200 as the dielectric layer, and the touch sensor 220 may be disposed directly under the antenna-deco film stack structure 200. In this case, the sensing electrodes of the touch sensor 220 may be used as the mesh ground pattern 112 (see FIG. 4) of the antenna-deco film stack structure 200.

A display panel 300 may include a pixel electrode 320, a pixel defining layer 330, a display layer 340, an opposing electrode 350 and an encapsulation layer 360 disposed on a panel substrate 310.

A pixel circuit including a thin film transistor (TFT) may be formed on the panel substrate 310, and an insulation layer covering the pixel circuit may be formed. The pixel electrode 320 may be electrically connected to, e.g., a drain electrode of the TFT on the insulation layer.

The pixel defining layer 330 may be formed on the insulation layer, and the pixel electrode 320 may be exposed through the pixel defining layer 330 such that a pixel region may be defined. The display layer 340 may be formed on the pixel electrode 320, and the display layer 340 may include, e.g., a liquid crystal layer or an organic light emitting layer.

The opposing electrode 350 may be disposed on the pixel defining layer 330 and the display layer 340. The opposing electrode 350 may serve as, e.g., a common electrode or a cathode of the display device. The encapsulation layer 360 may be disposed on the opposing electrode 350 to protect the display panel 300.

In some embodiments, the display panel 300 and the touch sensor 220 may be combined with each other through an adhesive layer 230. For example, a thickness of the adhesive layer 230 may be greater than each thickness of the first adhesive layer 215 and the second adhesive layer 225. A viscoelasticity of the adhesive layer 230 may be about 0.2 MPa or less at a temperature ranging from −20° C. to 80° C. In this case, a noise from the display panel 300 may be blocked, and an interface stress while being bent may be alleviated so that damages of the antenna-deco film stack structure 200 may be avoided. In an embodiment, the viscoelasticity of the adhesive layer 230 may be in a range from about 0.01 MPa to about 0.15 MPa.

What is claimed is:
1. An antenna-deco film stack structure, comprising:
   a deco film comprising a light-shielding portion and a transmissive portion;
   a dielectric layer facing the deco film;

an antenna pattern disposed on an upper surface of the dielectric layer and disposed under the deco film, the antenna pattern being at least partially covered by the light-shielding portion; and a ground pattern on a lower surface of the dielectric layer to at least partially cover the antenna pattern, wherein the antenna pattern comprises a radiation electrode, a pad and a transmission line electrically connecting the radiation electrode and the pad, and the ground pattern overlaps the radiation electrode of the antenna pattern, and does not overlap the pad.

2. The antenna-deco film stack structure according to claim 1, wherein the antenna pattern comprises a plurality of antenna patterns which are disposed under the light-shielding portion.

3. The antenna-deco film stack structure according to claim 2, wherein the ground pattern overlaps the plurality of antenna patterns in a planar view.

4. The antenna-deco film stack structure according to claim 1, wherein the pad is disposed under the light-shielding portion of the deco film, and the radiation electrode is disposed under the transmissive portion of the deco film.

5. The antenna-deco film stack structure according to claim 4, wherein the radiation electrode includes a mesh structure.

6. The antenna-deco film stack structure according to claim 5, wherein the pad has a solid pattern structure.

7. The antenna-deco film stack structure according to claim 5, further comprising a dummy mesh electrode on the upper surface of the dielectric layer to be separated from the radiation electrode, the dummy mesh electrode being disposed under the transmissive portion.

8. The antenna-deco film stack structure according to claim 7, wherein a surface of the radiation electrode or a surface of the dummy mesh electrode is thermally oxidized.

9. The antenna-deco film stack structure according to claim 7, further comprising a mesh ground pattern on the lower surface of the dielectric layer, wherein the mesh ground pattern overlaps the dummy mesh electrode in a planar view.

10. The antenna-deco film stack structure according to claim 1, wherein the pad comprises a signal pad connected to the transmission line, and a ground pad spaced apart from the signal pad and electrically separated from the transmission line.

11. The antenna-deco film stack structure according to claim 10, wherein the ground pad comprises a pair of ground pads facing each other with respect to the signal pad.

12. A display device, comprising:

a display panel; and the antenna-deco film stack structure of claim 1 on the display panel.

13. The display device according to claim 12, further comprising a touch sensor between the display panel and the antenna-deco film stack structure.

14. The display device according to claim 12, wherein the dielectric layer of the antenna-deco film stack structure includes a polarizing layer.

15. The display device according to claim 12, further comprising a polarizing layer between the display panel and the antenna-deco film stack structure.

16. The display device according to claim 12, further comprising a touch sensor between the display panel and the antenna-deco film stack structure and a polarizing layer between the touch sensor and the antenna-deco film stack structure.

* * * * *